United States Patent [19]

Dahl

[11] 4,247,682
[45] * Jan. 27, 1981

[54] AROMATIC KETONE AND SULFONE POLYMERS AND PROCESS FOR THE PREPARATION THEREOF

[75] Inventor: Klaus J. Dahl, Atherton, Calif.

[73] Assignee: Raychem Corporation, Menlo Park, Calif.

[ * ] Notice: The portion of the term of this patent subsequent to Apr. 27, 1993, has been disclaimed.

[21] Appl. No.: 36,544

[22] Filed: May 7, 1979

Related U.S. Application Data

[62] Division of Ser. No. 629,887, Nov. 11, 1975, abandoned.

[51] Int. Cl.³ .................... C08G 67/00; C08G 75/23
[52] U.S. Cl. .................... 528/175; 528/125; 528/126; 528/128; 528/172; 528/174; 528/176; 528/179; 528/180; 528/182; 528/184; 528/190; 528/191; 528/193; 528/206; 528/207; 528/220; 528/222; 528/224; 528/225; 528/227; 528/228; 528/271; 528/360; 528/363
[58] Field of Search ............... 528/125, 126, 128, 172, 528/174, 175, 176, 179, 180, 182, 184, 190, 191, 193, 206, 207, 220, 222, 224, 225, 227, 228, 271, 360, 363

[56] References Cited

U.S. PATENT DOCUMENTS

| | | | |
|---|---|---|---|
| 3,065,205 | 11/1962 | Bonner, Jr. | 528/125 |
| 3,441,538 | 4/1969 | Marks | 528/174 |
| 3,953,400 | 4/1976 | Dahl | 528/174 |

FOREIGN PATENT DOCUMENTS

| | | | |
|---|---|---|---|
| 971227 | 9/1965 | United Kingdom | 528/125 |
| 1078234 | 8/1967 | United Kingdom | 528/125 |
| 1086021 | 10/1967 | United Kingdom | 528/175 |
| 1109842 | 4/1968 | United Kingdom | 528/175 |
| 1153527 | 5/1969 | United Kingdom | 528/174 |

*Primary Examiner*—Lester L. Lee
*Attorney, Agent, or Firm*—Lyon & Lyon

[57] ABSTRACT

A polymer of the general formula: R'—M—Ar—B—Ar'—MArBAr'—$_{k-2}$ M—Ar—B—Ar'—R" wherein M and D, which can be the same or different, are independently

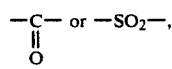

wherein each Ar is independently

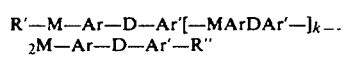

wherein L is

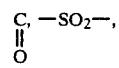

phenyleneoxy,

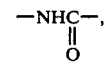

a covalent bond or T, wherein
T is as defined below
and each Ar' is independently

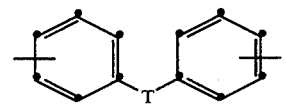

wherein $T$ is O, S, phenyleneoxy, or —CR$_2$— wherein R is as defined below, or —O—Ar—O— wherein Ar can have any of the values set forth above and wherein R' and R" are independently

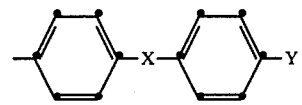

wherein X is a covalent bond, —O—, —S—, or —CR$_2$— wherein each R is independently hydrogen, an alkyl or fluoroalkyl group, preferably of 1 to 10 carbons, phenyl or an electron withdrawing group substituted phenyl, Y is CN, NO$_2$,

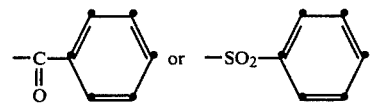

or if X is a covalent bond, Y can be hydrogen as well as any of the foregoing; or Ar"CO— or Ar"SO$_2$— wherein Ar" connotes phenyl, phenoxyphenyl, naphthyl, biphenyl or terphenyl either unsubstituted or substituted with one or more electron withdrawing substituents such as halogen, nitro, or cyano, provided that when Ar" is phenoxyphenyl there shall be at least one electron withdrawing substituent on the phenoxy moiety and wherein k is the number of repeating units in the molecule and process for the preparation thereof.

37 Claims, No Drawings

AROMATIC KETONE AND SULFONE POLYMERS AND PROCESS FOR THE PREPARATION THEREOF

This is a continuation, of application Ser. No. 629,887, filed Nov. 11, 1975 now abandoned.

BACKGROUND OF THE INVENTION

In the continuing search for organic polymers suitable for use at elevated temperatures, many different repeating structures involving diverse connecting linkages between aromatic moieties have been suggested, e.g., aromatic structures connected by linkages such as imides, ethers, sulfones, ketones, etc. Unfortunately, as potential performance at elevated temperature has been enhanced, the amenability of the polymer candidates to classical molten techniques of polymer fabrication has declined or disappeared. More often than not, the same decline in melt processability accompanies attempts to produce high temperature stable polymers having an elongation of at least about 50%, a necessary property for many polymer applications, e.g., if the polymer-insulated wire is to be capable of being twisted about itself without cracking of the insulation.

Aromatic polyketones are known to enjoy relatively good resistance to thermal degradation. Bonner, in U.S. Pat. No. 3,065,205, suggested the Friedel-Crafts catalyzed polymerization of certain reactants to yield polyarylketones, and lists as typical Friedel-Crafts catalysts ferric chloride and boron trifluoride. The two basic reactions taught by this patent can be summarized as follows:

(1)  n(HR—O—RH)+n(Cl—A—Cl)→nHCl+H-(R—O—R—A)$_n$Cl and (2)  n(HBH)+n(Cl—A—Cl)→nHCl+Cl(A—B)$_n$H where HBH is a polynuclear aromatic hydrocarbon such as naphthalene, HR—O—RH is a diaromatic ether such as diphenyl ether, and Cl—A—Cl is a diacyl chloride such as terephthaloyl chloride or phosgene. When phosgene and diphenyl ether are reacted, the resulting polymer will comprise repeating units of the structure:

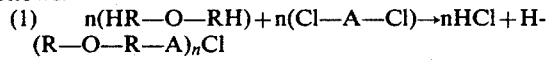

The same repeating unit is taught in British Pat. No. 971,227 to arise from the self-condensation of diphenyl ether-4-carbonyl chloride, and from the reaction of diphenyl ether with diphenyl ether 4,-4'-dicarbonyl chloride.

A different approach is taken by Farnham and Johnson in British Pat. No. 1,078,234. Here, polyarylethers are produced by reaction of an alkali metal double salt of a dihydric phenol with a dihalo benzenoid compound. The dihydric phenol may contain a keto group—thus, 4,4'—dihydroxy benzophenone is claimed to give rise to a polyarylether polyarylketone (See for example, claim 15 of the British Patent).

A number of patents dealing with the improved methods of making polyarylketones have issued. Thus, for example, processes disclosed in U.S. Pat. Nos. 3,441,538 and 3,442,857 derive advantage by the use of hydrogen fluoride-enhanced boron trifluoride catalysis, a catalyst system taught in Boron Fluoride and its Compounds as Catalysts, etc. Topchiev et al, Pergamon Press (1959), p. 122; J. Org. Chem 26 2401 (1961); and I & E Chem. 43, 746 (1951). A further patent dealing with an improved process for synthesising polyarylketones is British Pat. No. 1,086,021.

British Pat. 1,086,021 discloses the Friedel Crafts type condensation polymerization of diacid halides with a second compound containing at least two displaceable aromatically bound hydrogen atoms, preferably the diacid halide and the second compound being present in substantially equimolar amounts; or of a single compound containing both an acid halide group and at least one displaceable aromatically bound hydrogen atom. It is further disclosed that molecular weight control can be achieved by using non-stoichiometric amounts of the two compounds or by adding a third component which is monofunctional under the conditions of the reaction. Monoacid halides are mentioned as examples of suitable monofunctional molecular weight control agents.

British Pat. No. 1,109,842 discloses the polymerization reaction of aryl disulphonyl halides with compounds containing at least two displaceable aromatically bound hydrogens. In all the examples of this patent, as in those of U.S. Pat. No. 1,086,021, either equimolar amounts of electrophile and nucleophile or an excess of the electrophile (i.e., diacid halide) is used. This patent further teaches the quenching of residual sulphonyl chloride groups by post polymerization addition of bases such as aniline, sodium carbonate or diphenylether as "residual sulphonyl chloride groups on the polymer chains may cause the products to suffer from rising viscosity when molten".

The foregoing teaching is incorporated herein by reference to illuminate the background of this invention. In my previously filed, copending, commonly assigned application U.S. Ser. No. 451,121, which is a Continuation-In-Part of application Ser. No. 218,465, I disclose the preparation of polyarylketones of mean inherent viscosity (0.1% W/V in sulfuric acid) 0.8 to about 1.65. The inherent viscosity and likewise molecular weight is controlled by the judicious use of selected nucleophilic agents whose reactivity to acetylation (relative to a benzene reactivity equal to 1) is greater than about 150.

The use of nucleophiles as molecular weight control agents in polymerizations of this type is preferred since, in addition to the undesirable hereinbefore mentioned melt stability problem (which results from the presence of excess electrophile which in turn results in residual acid halide polymer chain end groups) it has been found that the presence of an excess of acid halide groups (i.e., electrophile) during polymerization leads to the formation of branched chain polymers due to ortho-acylation of nucleophilic interior segments (such as diphenyl ether moieties) in a polymer chain by the terminal acid halide groups of neighboring chains, i.e., while numerous para sites on the nucleophile are still available linear chain building will occur but once such sites become low in concentration the ordinarily much slower acylation reactions at the ortho position becomes significant.

This problem has been discussed in Angelo, et al (U.S. Pat. No. 3,767,620) which describes the formation of 9-phenylenexanth-hydrol residues

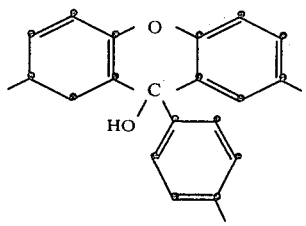

through ortho acylation during the preparation of a polymer having the repeating structural formula:

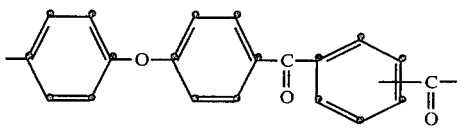

Said residue is formed by the reaction of a diacyl halide with diphenyl ether such that at least some of the diacyl halide acylates diphenyl ether residues in each ring ortho to the oxygen atom (i.e., virtually all the para positions are already blocked by prior acylation). Such ortho acylated moieties are indicated as leading to thermal instability, specifically, impaired melt processability. Such degradation can be reduced by hydrogenation (reduction) of the polymer, for example, with ethanol and hydrochloric acid, formic acid or preferably triethyl silane in homogeneous acid media, to give the much more stable 9-phenylenexanthene residue. This reduction purportedly leads to products of lighter color and much improved melt stability due to the removal of the hydroxyl group and its replacement by a hydrogen atom.

Treatment of the above branched polymer, dissolved in dichloroacetic acid, with triethyl silane is also recommended by Agolino in U.S. Pat. No. 3,668,057 as a means of stabilizing branched chain residues.

Of course, if as I have taught in my application Ser. No. 451,521, filed Mar. 15, 1974, the polymerization is carried out with the nucleophilic agent in excess, and/or molecular weight control is effected with a nucleophilic compound, then an excess of para sites on the nucleophilic compound is available and the above-mentioned deleterious branching reaction will not occur.

However, I have now discovered that when the terminal group on either or both ends of each polymer chain is a phenoxy (or other nucleophilic) moiety having a para position available for reaction then, in highly acid media such as hydrogen fluoride boron fluoride mixtures, a preferred polymerization reaction media, another heretofore unknown branching reaction occurs. It is believed that such branching results from the reaction of the phenoxy (or other nucleophilic) groups (presumably activated, i.e., protonated by the acid media) with carbonyl groups in the polymer itself leading, I believe, to the formation of trisaryl carbonium salts. In addition to the deleterious effect of branching per se on processability, such salts are thermally very unstable and lead to degradation and discoloration in the polymer when molten.

As disclosed in my copending, commonly assigned application Ser. No. 603,635, filed Aug. 11, 1975, treatment of the polymerized reaction media with certain bases before isolation of solid polymer substantially improves the thermal stability of polymers prepared by Friedel-Crafts condensation polymerization through a controlled decomposition of ketonic and other complexes formed with the catalyst. However, even this post polymerization treatment does not, of course, preclude the formation of branched polymer chains by ortho acylation which can lead to poor reproduceability in the control of the molecular weight of the polymer and hence a certain degree of unpredictability in extrusion performance.

Moreover, this treatment does not address itself to the hereinabove mentioned strong acid catalysed protonated phenoxy group branching reaction which takes place concurrently with the polymerization reaction itself and can continue as long as the polymer is in a strongly acid media.

Thus a need exists for a method of preparing polyarylketones and polyaryl sulfones by a Friedel-Crafts condensation polymerization reaction which yields linear, unbranched products of reproducible molecular weight, stable and predictable melt viscosity, and enhanced stability in highly acid solutions. The term acylation as used in the instant application connotes the reaction in acidic media of the moiety $ArCO^+$ or $ArSO_2^+$ with an aromatic nucleophile wherein Ar represents the residue of a protonated monomer or a polymer chain which is continuing to undergo polymerization (chain growth) by means of the acylation reaction. The term acid halide therefore connotes any reactive species forming the moiety $ArCO^+$ or $ArSO_2^+$ under Friedel-Crafts reaction conditions. Common examples include AR—COCl, Ar—COOH and Ar—COOR and the sulfonyl analogues thereof.

OBJECT OF THE INVENTION

It is an object of this invention to provide a process affording stable, melt extrudable, linear polyarylketones and polyarylsulfones having reproducible molecular weights.

It is another object of this invention to provide polyarylketones and polyarylsulfones having reproducible melt viscosities and extrusion behavior, i.e., good melt stability.

It is another object of this invention to provide polyarylketones and polyarylsulfones which form highly stable solutions even in strongly acidic media.

These and other objects and advantages of the instant invention will be further discussed or made apparent in conjunction with the detailed description thereof and of the embodiments and examples thereof set forth hereinafter.

DESCRIPTION OF THE INVENTION

I have discovered that polymers substantially superior to the related polymers heretofore made can be obtained by use of reactants I term "capping agents".

According to my invention, there is provided novel melt processable polyarylketone and polyarylsulfone polymers comprising repeating units of the general formula: ${+M-Ar-D-Ar'+}$ wherein M and D, which can be the same or different, are independently

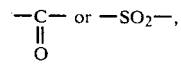

wherein Ar is

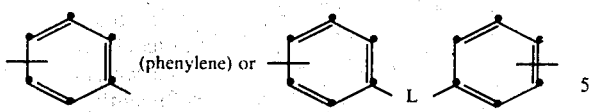 (phenylene) or wherein L is

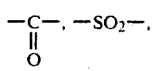

phenyleneoxy,

a covalent bond or T, wherein T is as defined below and Ar' is:

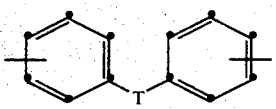

wherein T is O, S, phenyleneoxy, or —CR$_2$— wherein R is as defined below, or —O—Ar—O— wherein Ar can have any of the values set forth above, and wherein each polymer molecular is "capped", at each end by a nucleophilic or electrophilic capping agent. Preferably when Ar' is

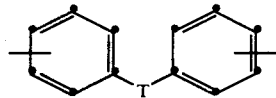

and T is —O—Ar—O— the Ar segment of the T moiety will not be the same as Ar chosen for the Ar segment in the [—M—Ar—D—Ar'—] polymer unit. The term "capped" means that the capping agent forms the terminal group at one or both of the two ends of each polymer chain. In some instances, as will be hereinafter explained in greater detail, the terminal groups at both ends of the polymer chain are formed by a single capping agent. In other cases two capping agents are used, one of which caps one end and the other the other end of the polymer chain. The nucleophilic capping agents have the general formula:

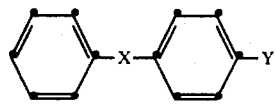

wherein X is a covalent bond, —O—, —S—, or —CR$_2$— wherein each R is independently hydrogen, an alkyl or fluoroalkyl group, preferably of 1 to 10 carbons, phenyl or an electron withdrawing group substituted phenyl. Preferably X is —O— or a covalent bond. Y is CN, NO$_2$,

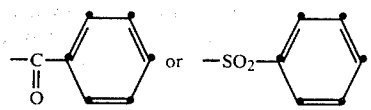

or if X is a covalent bond, Y can also be hydrogen as well as any of the foregoing.

It will be realized by those skilled in the art that although in most instances polymer chains have two ends (i.e., are linear), in some circumstances, as for example, to produce melt processable polymers with high melt strength, it may be preferable to provide polymers having chains with three or more ends, i.e., with long chain branches and that in such circumstances the present invention contemplates capping all the ends of such molecules even though the term "double" capped is used.

The electrophilic capping agents have the general formula Ar″COZ or Ar″SO$_2$Z wherein Z is OH, halogen (preferably chlorine or fluorine) or OR wherein R is an alkyl group, preferably C$_1$ to C$_{10}$ alkyl, and wherein Ar″ connotes phenyl, phenoxyphenyl, naphthyl, biphenyl or terphenyl either unsubstituted or preferably substituted with one or more electron withdrawing substituents such as halogen, nitro or cyano. In the case where Ar″ is phenoxyphenyl there must be at least one electron withdrawing substituent on the phenoxy moiety, preferably in the para-position. For all other choices for Ar″ electron withdrawing substituents are desireable although not essential.

The novel double capping process of the present invention provides double capped polymers which have excellent high temperature stability properties and which are melt processable so as to provide an extrudable product suitable for uses such as wire and cable insulation. Additionally, the polymers of the present invention can be fabricated by conventional injection molding techniques. Additionally, these polymers are substantially free from chain branching except when desired.

The polymers produced by the process of this invention are characterized by light color and excellent thermal stability. In addition, they form stable solutions even in highly acidic media such as hydrogen fluoride/boron trifluoride mixtures. Moreover, as these polymers are essentially inert to further reaction with either electrophilic or nucleophilic reagents any residual polymer left in solution in a reactor (for example on the walls of the reactor) after completion of one polymerization does not have to be washed out before commencement of another polymerization. Residual polymer prepared by prior art processes continues to increase in molecular weight when contacted with additional monomer and catalyst and thus has to be carefully removed between polymerizations to avoid the presence of variable amounts of high molecular weight polymer in the products.

It is appropriate in order to facilitate a fuller understanding of the present invention to distinguish at this point between terms which are frequently and generally erroneously used interchangeably in the prior art pertaining to Friedel-Crafts catalysed polymerizations. The term "quenching agent" connotes a compound, usually a Lewis base (nucleophile), which is added, almost invariably in very substantial excess, to a polymerization reaction mixture after completion of the polymerization reaction to react with the polymer end group-catalyst complex so that the polymer molecule is substantially less likely to undergo further undesireable reaction by chemical attack of the polymer end groups on neighboring molecules with which the polymer molecule comes in contact during subsequent processing or use. Molecular weight control, in contradistinction, is generally effected by having, at the start of polymerization, a molar excess of either the nucleophilic or the electrophilic difunctional reactant or by adding, at any time before polymerization is complete, a nucleophilic or electrophilic reagent which is monofunctional under the polymerization reaction conditions and which thereby serves as a chain terminator. Such monofunctional chain termination agents are, of course, also useful when effecting polymerization using a monomer having both electrophilic and nucleophilic moieties on the same molecule. It is, of course, apparent that a quenching agent can suitably be used in conjunction with a molecular weight control agent.

A capping agent, which can be either electrophilic or nucleophilic, serves a different function from either a quenching or molecular weight control agent. Its purpose is to become the groups at both ends of the polymer molecule and thereby cause the end groups of the polymer molecule to be at least as resistant to chemical attack as the remainder of the molecule. Its primary function is not to stop the polymerization and in fact, unlike quenching agents, it can be present in the polymerization mixture throughout the polymerization reaction. It should be noted that compounds which function as capping agents as above defined, can under some circumstances serve the function of molecular weight control or, if added in large excess, contrary to the teaching of the present invention, can in some instances quench the reaction. However, the prior art has invariably used either an electrophilic or nucleophilic molecular weight control agent under conditions which results in the polymer molecule being reactive i.e., uncapped as herein defined, at at least one end. For example, my U.K. Pat. No. 1,387,303 contains a discussion of the use of so called capping agents in connection with polymerization reactions analogous to those described herein. However, it should be noted that in the context of that patent, the so called capping agents were in fact molecular weight control agents functioning exclusively as such and not as true capping agents as described in the instant specification. In fact, such prior art agents could not in fact achieve the objectives of the present invention when used as described in said U.K. patent. Indeed, the nature and significance of double capping as disclosed and claimed herein was not appreciated at the time of said U.K. patent.

The present invention contemplates the use of a capping agent to provide a polymer molecule which is unreactive and resistant to chemical attack at both ends of the molecule. Use of a quenching and/or molecular weight control agent as hereinabove defined in conjunction with a capping agent provides no useful effect and can in some circumstances be deleterious. Conceptually, the distinction between quenching agents and capping agents can be analogised by considering the former as reducing the tendency of the polymer to bite, i.e., attack, other molecules including monomer or oligomer, while the latter increases the polymer's resistance to being bitten. Since a quenching agent can only be added after the entire polymerization is complete, the use of a molecular weight control agent without a capping agent means that in any polymerization reaction mixture there will be present before quenching substantial numbers of "completed" molecules whose growth has been stopped by the molecular weight control agent but which are nonetheless sufficiently unstable that they are undergoing degradation. Since other molecules are, of course, still undergoing polymerization, it is impractical to deactivate these completed molecules by adding a quenching agent. Thus, when the polymerization reaction is finally quenched, it will contain a significant proportion of molecules whose chain growth was completed early on and which thereafter degraded. This problem is particularly acute when highly reactive catalysts such as HF—BF$_3$ are utilized. This is one of the problems unexpectedly solved by the process of the instant invention.

The polymers with which the present invention is particularly concerned include poly aryl ketones comprising repeating units of the structure:

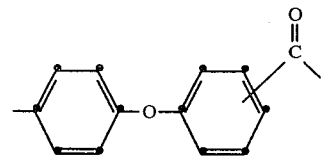

i.e., poly(benzophenone ether). As especially preferred, there may be mentioned homopolymers and copolymers having such repeating units and displaying a mean inherent viscosity within the range from about 0.8 to about 1.65. Such polymers and the preparation thereof are disclosed in my said previously filed application Ser. No. 218,465. Secondly, there may be mentioned poly aromatic ketone polymers characterized by the repeating unit:

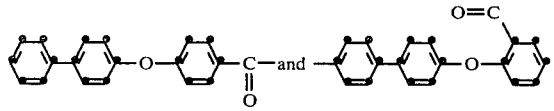

and especially homopolymers of para-biphenylyloxybenzoyl monomers and also copolymers thereof incorporating minor proportions of corresponding orthocomonomers, polymers having a mean inherent viscosity between about 0.5 and about 1.7 being particularly preferred. Analogous polymers and the manner of their preparation are described in my application Ser. No. 451,521, filed Mar. 15, 1974.

Other polymers and the preparation of which the present invention is concerned with include the sulfonyl analogs of the above-indicated polyaryl ketones and the other polymers described in U.S. Pat. Nos. 3,441,538; 3,442,857; 3,321,449; and British Pat. Nos. 971,227 to Goodman et al and 1,016,245 to Jones, the disclosures of which are incorporated herein by reference to avoid unnecessary enlargement of the present specification.

Particularly useful solvents for use in such polymerizations include nitrobenzene, o-dichlorobenzene, symtetrachloroethane, methylene chloride, mixtures of any of the foregoing, and also anhydrous hydrogen fluoride. The common Friedel-Crafts catalysts can suitably be employed in the polymerization process include, for example, aluminum chloride, aluminum bromide, boron trifluoride, hydrogen fluoride, ferric chloride, stannic chloride, indium chloride and titanium tetrachloride. Aluminum, indium and ferric chlorides are preferred catalysts and mixtures of hydrogen fluoride and boron trifluoride are particularly preferred.

The amount of, for example, the preferred catalysts such as aluminum chloride or boron trifluoride will ordinarily be at least one molar equivalent per carbonyl or sulfonyl group in the monomeric reactants. In the case of ferric or indium chloride less than a molar equivalent is ordinarily used.

The polymers with which the present invention is concerned are prepared by condensation polymerization. The condensation polymerizations contemplated by the instant invention are of two types. In type I there are two monomeric starting materials, the first monomeric reactant which may be generally described as a diacid halide (electrophilic reagent) and a second monomeric reactant containing at least two displaceable aromatically bound hydrogen atoms (nucleophilic reagent). If [EE] is the molar concentration of the electrophilic reagent and [NN] is the molar concentration of the nucleophilic reagent and EE is in excess, then the molecular weight of the resulting polymer is given by the formula:

$$MW = \frac{[EE] + [NN]}{[EE] - [NN]} \times \frac{w}{2}$$

where w is the molecular weight of the repeating unit (i.e., the EENN residue) of the polymer.

Thus, use of an excess of EE effects molecular weight control. Conversely, if NN is in excess to control molecular weight, the molecular weight is equal to:

$$\frac{[NN] + [EE]}{[NN] - [EE]} \times \frac{w}{2}$$

If EE is in molar excess then the polymer chains will tend to have acid halide end groups which, as is also well known to those skilled in the art, readily react further leading to branched polymer chains and instability of the polymer when molten.

Conversely, I have unexpectedly discovered that when NN is used in excess to an effort to effect molecular weight control and NN contains phenoxy groups or groups similar to reactivity to acylation to a phenoxy group, which groups will be at at least one end of the polymer chain because of the excess of NN, then reaction of these end groups with the ketone-catalyst complex during or after polymerization tends to occur so as also to cause branching, I believe, through the formation of trisaryl carbonium ion salts.

Furthermore, I have also discovered that molecular weight control through the addition of monofunctional molecular weight control compounds to a stoichiometric mixture of the starting materials will not avoid either of the above problems as, depending on whether the monofunctional agent is an electrophile or a nucleophile, each polymer molecule will have an electrophilic or a nucleophilic group respectively at the end of the polymer molecule distant from the weight control agent residue which end group can react further and cause chain branching. The molecular weight of the resultant polymer is given by the formula:

$$MW = \frac{[C] \times w}{[T]}$$

where [C]=[NN]=[EE] and wherein [T] is the molar concentration of molecular weight control agent used, and w is the molecular weight of the repeating unit of the polymer. It is thus apparent that molecular weight control for the polymer in a type I reaction by use of excess nucleophilic monofunctional molecular weight control compound does not in any way address or solve the problems of polymer stability to which the present invention is directed.

In the other type of polymerization (type II) only one monomer, having both an acid halide group and at least one aromatically bound displaceable hydrogen is used. If the molar concentration of the monomer is [EN] and a monofunctional molecular weight control agent is used then the molecular weight of the polymer is given by:

$$MW = \frac{[EN] \times w}{[T]}$$

wherein [T] and w are as defined above. Again, use of a monofunctional agent for molecular weight control suffers from the disadvantage that at least one end of each polymer molecule is terminated either by a reactive nucleophilic or electrophilic group which can serve as a branch initiator.

Accordingly, the instant invention provides Friedel Crafts condensation polymers whose molecules are capped at both ends by groups which do not serve as branch initiators under polymerization conditions.

For a Type I condensation polymerization either the electrophile or the nucleophile can be present in excess or both can be present in equimolar amounts. In the first and second cases the molecular weight is controlled by the excess reactant, as above indicated. In the first case, a nucleophilic capping agent will effectively cap both ends of the polymer chain. In the second case an electrophilic capping agent will cap both ends of the polymer molecule. In a Type I polymerization, when equimolar amounts of electrophile and nucleophile are present or in a Type II polymerization both an electrophilic and a nucleophilic capping agent are added and the polymer chain is capped with the nucleophilic cap at one end and the electrophilic cap at the other. A further advantage of the present invention is that under such circumstances the capping agents will serve the additional function of a molecular weight control agent.

The electrophilic polymer end cap for the polymers produced in accordance with the instant invention have the structure ArCO— or ArSO₂— wherein Ar is as previously defined for the electrophilic capping agent. The nucleophilic polymer end cap will have the structure:

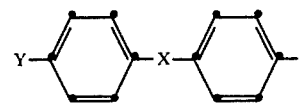

wherein Y and X are as previously defined for the nucleophilic capping agent.

Appropriate ratios of ingredients in accordance with the instant invention for type I polymerizations are as follows:

| Case a [EE] > [NN] | |
|---|---|
| Molar fraction of difunctional electrophile [EE]: | 1 |
| Molar fraction of difunctional nucleophile [NN]: | 1 − a |
| Molar fraction of nucleophilic capping agent: | 2a |
| Case b [NN] > [EE] | |
| Molar fraction of difunctional electrophile [EE]: | 1 |
| Molar fraction of difunctional nucleophile [NN]: | 1 + a |
| Molar fraction of electrophilic capping agent: | 2a |
| Case c [NN] = [EE] | |
| Molar fraction of difunctional reagents (EE & NN) | 1 |
| Molar fraction of nucleophilic capping agent: | a |
| Molar fraction of electrophilic capping agent: | a |

Note that in cases a and b the capping agent may be added at any stage of the polymerization, including after polymerization is complete, and no separate molecular weight control agent is necessary. In case c, one of the capping agents functions also as a molecular weight control agent and therefore is preferably added early in the polymerization, most preferably at the beginning of the reaction. The other capping agent in contradistinction can be added at any time. It will preferably be electrophilic but can be nucleophilic. Preferably, in all three cases, the capping agent(s) are added at the beginning of or early in the course of the polymerization.

For a condensation polymerization of type II, as in case Ic, the objectives of the inventions are attained by adding about equal molar fractions of both electrophilic and nucleophilic capping agents. Under these circumstances, a separate molecular weight control agent is not required. The ratios of ingredients for a type II condensation are:

| Molar fraction of Type II monomer | 1 |
|---|---|
| Molar fraction of nucleophilic capping agent | a |
| Molar fraction of electrophilic capping agent | a |

In practice it is frequently difficult to select precisely the same amount of each capping agent and we find that extreme precision is not required. It is preferable, where precise equivalence of electrophilic and nucleophilic capping agents cannot be provided, to use a very slight excess of the nucleophilic agent.

For both Type I and Type II reactions, the numerical value of a will preferably vary from about 0.001 to about 0.05, preferably 0.002 to 0.01 based on a value of 1 for the monomer, as above indicated.

As hereinabove indicated, the capping agents utilized in the practice of the present invention can be either nucleophilic or electrophilic.

Preferred nucleophilic capping agents include biphenyl, 4-phenoxy benzophenone, or an equimolar mixture of diphenyl ether and benzoic acid or a derivative thereof which forms 4-phenoxy benzophenone in situ.

Preferred electrophilic capping agents include benzoic acid, benzene sulfonic acid or the corresponding acid halides.

The polymers of the present invention preferably have viscosities ranging from about 0.5 to 2.0 and containing from about 5 to about 300 repeating units. As is apparent, both homo and copolymers can be prepared in accordance with the teaching of the instant invention by using a mixture of electrophilic and/or nucleophilic bifunctional monomers and/or a mixture of monomers of the EN type.

The invention is further illustrated with respect to some of the preferred embodiments thereof in the following examples, in which all parts are by weight and temperatures are in °C. unless otherwise noted. Throughout, mean inherent viscosity is determined according to the method of Sorenson et al, Preparative Methods of Polymer Chemistry Interscience (1968), p. 44 [0.1 g polymer in 100 ml. soln. of conc. $H_2SO_4$ at 25° C.]. Electronic spectra of polymer solutions were determined with a Perkin-Elmer 450 spectrophotometer using silica cells having a 1 cm path length. A polymer sample of 0.02 to 0.05 g was dissolved in 5.00 ml of dichloroacetic acid at 150°–160° by agitating the sample for 15 to 20 min. The solution was recorded against a dichloroacetic acid blank. The absorbance reading obtained at 495 nm was divided by the solution concentration in grams per milliliter to give an absorbancy index value ($A_s$) which is a measure of branched sites in the polymer.

EXAMPLE 1

BRANCHING DUE TO PHENOXY END GROUPS INTERACTING WITH CARBONYL LINKAGES IN THE POLYMER, MODEL COMPOUND STUDY.

A sample of 2.36 g (10 mmoles) of p-phenoxybenzoyl chloride containing 0.573 mole % of biphenyl and 0.573 mole % benzoic acid was polymerized in the standard manner. One half of the reaction solution was worked up by precipitation to give a polymer of inherent viscosity 1.33 and an As value of 10 at 495 nm. This product was compression molded at 400° for 5 min. to give a colorless slab of the same inherent viscosity 1.33. To the other half of the polymer solution was added 2.5 g (ca 10 mmoles) of 4-bromodiphenyl ether acting as a "model" for reactive end groups formed by prior art polymerization. This mixture was stirred for 16 hr at room temperature and then recovered by precipitation into water. The polymer precipitate was washed with acetone to remove any excess 4-bromodiphenyl ether followed by drying to give a colorless product of inherent viscosity 1.33 and an $A_s$-value of 540 at 495 nm indicating a considerable amount of tris-aryl carbonyl structures were formed. This product was compression molded at 400° for 5 min to give a slab of decreased inherent viscosity (1.22).

EXAMPLE 2

SUPPRESSION OF GEL FORMATION DURING POLYMERIZATION BY DICAPPING

A sample of 37.9 parts of p-phenoxybenzoyl chloride containing 0.134 parts (0.50 mole %) of biphenyl was placed in a cold (ca 0°) pressure reactor lined with FEP polymer and equipped with an agitator, heating and cooling coils, a number of nozzles, pressure and temperature regulating and controlling devices. Anhydrous hydrogen fluoride was cooled to −20° in a separate vessel and about 105 parts were slowly added to the monomer with stirring. The reaction temperature was slowly raised to 20° while maintaining a slow nitrogen purge. Hydrogen chloride which evolved during this process was allowed to escape through a condenser (held at −10°) and absorbed in a scrubber. The monomer solution was then cooled to 0° and boron trifluoride gas was admitted to give a system pressure of 35 psig.

and a reaction temperature of 14°. These pressure/temperature conditions were maintained for 4.5 hr. Then the boron trifluoride supply was discontinued, and the reactor and contents were cooled to +7°, followed by venting of boron trifluoride to the scrubber until ambient pressure was established. The resulting polymer solution was transferred to a larger vessel and diluted with hydrogen fluoride and 13.6 parts of water to give a solid content of 4.5%. This solution was pressure fed via a polypropylene cartridge filter (10μ) to a two-fluid spray nozzle for recovery of solid polymer by spray drying as described in U.S. Pat. No. 3,751,398. During this process, the filter cartridge became obstructed by gelatinous polymer material and had to be replaced four times before completing the run. The polymer recovered by spray drying was colorless and had an inherent viscosity of 1.38. The gelatinous material removed from the cartridge filter was found to be insoluble in hydrogen fluoride, hydrogen fluoride/boron trifluoride mixture, or concentrated sulfuric acid. This insoluble material was suspended in hydrogen fluoride and agitated overnight, followed by filtration. The filter residue was washed with water and then dried at 110°/20 mmHg/16 hr to give a slightly pink polymer coagulate. Compression molding at 400° for 5 min gave an incompletely fused, dark brown slab. The fused material was not soluble in concentrated sulfuric acid. Differential scanning calorimetry indicated a melting point at 365°, a glass transition temperature of 165° and a recrystallization temperature of 263°, the corresponding numbers for the hydrogen fluoride soluble spray dried polymer are 365°, 165° and 210°, respectively. A sample of 0.0174 g of coagulate from the insoluble residue was dissolved in 5 ml of dichloroacetic acid at 160° to give a deep red solution, which was diluted 1:20 with dichloroacetic acid and analyzed by electronic absorption spectroscopy. A strong band was observed at 495 mm showing an absorbance of 0.8 p-Trisphenoxyphenylcarbinol exhibits a strong absorption in dichloroacetic acid at 495 nm with an extinction coefficient of $1.1 \times 10^5$. Assuming that the same type of structure exists in the polymer coagulate, calculation would suggest ca 2 mole % of branches/crosslinks.

The above polymer preparation which is an example of the best available prior art techniques was repeated a number of times leading invariably to filter obstruction of differing severity. When the polymer preparation was repeated in the presence of 0.50 mole % of biphenyl and 0.475 mole % of benzoic acid in accordance with the teachings of the instant invention a polymer of inherent viscosity 1.35 was obtained and the batch could be filtered and spray dried without interruption, in fact a number of batches could be filtered through the same cartridge before change became necessary due to accumulation of foreign, nonpolymeric material.

EXAMPLE 3

BRANCHING DURING POLYMER PREPARATION

Batches of polymer using 37.9 parts of p-phenoxybenzoyl chloride were prepared in an FEP lined pressure reactor as described in Example 2, i.e., not in accordance with the instant invention. In two sets of experiments no effort was made to remove residual polymer left in the reactor from previous runs (A-1, A-2). Then two experiments were run where the reactor was thoroughly cleaned of old polymer before charging new monomer and anhydrous hydrogen fluoride (B-1, B-2).

The polymers were recovered by spray drying and the inherent viscosity of powders and compression molded slabs determined. Slab color (rating: 1=colorless, 10=dark brown), $A_s$ of the powder, and extrudability of the powder in a ¾ inch Brabender extruder were evaluated. The data obtained are shown below.

| Batch | $A_s$(495nm) | Inherent Viscosity powder slab | Color No. | Extrudability |
|-------|--------------|-------------------------------|-----------|---------------|
| A-1   | 250          | 1.35 1.21                     | 8         | No            |
| A-2   | 314          | 1.45 1.35                     | 8         | No            |
| B-1   | 14           | 1.31 1.35                     | 2         | Yes           |
| B-2   | 70           | 1.40 1.39                     | 5         | Yes           |

In spite of careful removal of old polymer from the reactor before charging new monomer during a sequence of ten experiments $A_s$ values between 10 and ca 70 analogous to B-1 and B-2 were observed. This did not have a severe adverse effect on extrudability but undesirable color variations in the extrudate were noted. When polymerizations were controlled by dicapping with biphenyl and benzoic acid in accordance with the teachings of the instant invention instead of single capping with biphenyl only as taught by the prior art $A_s$-values equal to or less than 25 were consistently observed.

EXAMPLE 4

SHELF LIFE EVALUATION OF MONO VERSUS DICAPPED POLYMER SOLUTIONS

Samples of 2.32 parts of p-phenoxybenzoyl chloride containing 0.50 mole % of the respective capping agents listed in the table below were polymerized at room temperature in 8 parts of anhydrous hydrogen fluoride under a boron trifluoride pressure of 30 psi for 4 to 90 hr. The resulting polymer solutions were worked up by precipitation into water. Evaluation for inherent viscosity was conducted in the usual manner and the data are shown below.

| REACTION TIME hr | INHERENT VISCOSITY Capping Reagent: Diphenyl-ether | 1,4 diphenoxy benzophenone | Biphenyl/Benzoic Acid (0.5 mole % of each) |
|---|---|---|---|
| 4  | 1.2* | 1.2* | 1.5+ |
| 90 | 1.8* | 2.3* | 1.5+ |

*These experiments were not in accordance with the instant invention.
+These experiments were in accordance with the instant invention.

This example indicates that double capping in accordance with the teaching of the present invention provides a consistent viscosity product unaffected by wide variations in reaction time.

EXAMPLE 5

POLYMERIZATION IN HYDROGEN FLUORIDE CONTAINING SULFUR DIOXIDE. MONOCAPPING VERSUS DICAPPING

Samples of p-phenoxybenzoyl chloride containing 0.60 mole % of biphenyl or a mixture of 0.60 mole % of biphenyl and 0.60 mole % benzoyl chloride were polymerized at a monomer concentration of 20% in HF of variable sulfur dioxide content for 4 hr at room temperature and 30 psi boron trifluoride pressure. The resulting polymers were recovered in the standard manner and evaluated for inherent viscosity; these data are shown below.

| SULFUR DIOXIDE CONC. | INHERENT VISCOSITY | |
|---|---|---|
| % | Monocapped* | Dicapped+ |
| 0 | 1.3 | 1.3 |
| 10 | 1.8 | 1.4 |
| 50 | crosslinked | 1.4 |

Aliquots of the above polymer solutions containing hydrogen fluoride only as solvent were diluted after polymerization with sulfur dioxide to give a solids content of 5%. These solutions were then held for 24 hr under a pressure of 30 psi boron trifluoride pressure. Inherent viscosity measurements showed a substantial increase for the monocapped polymer while the dicapped polymer showed no change.

| SULFUR DIOXIDE CONC. | INHERENT VISCOSITY | |
|---|---|---|
| % | Monocapped* | Dicapped+ |
| 0 | 1.3 | 1.3 |
| 75 | 2.3 | 1.3 |

*Not in accordance with the instant invention
+In accordance with the instant invention

EXAMPLE 6

POSTPOLYMERIZATION OF DICAPPED VERSUS MONOCAPPED POLYMER

A. A 150 ml polychlorotrifluoroethylene tube was charged with 2.3265 g (10.00 mmoles) of p-phenoxybenzoyl chloride, 0.0077 g (0.05 mmoles) of biphenyl, 0.057 g (0.05 mmoles) of benzoid acid, and a stir bar. To this mixture was slowly added 10 ml of anhydrous hydrogen fluoride. The tube was then connected to a polychlorotrifluoroethylene vacuum line (Toho Kasei Co. Ltd., Osaka, Japan) which had been purged with nitrogen. Boron trifluoride gas was admitted and the reaction mixture was held at 30 psi pressure for 4 hr to give a viscous orange solution. Excess boron trifluoride was purged from the reaction system after being cooled to $-78°$ C. The polymer solution was diluted with aqueous hydrogen fluoride and then poured into rapidly stirred water. The resultant polymer precipitate was filtered and washed with water, followed by drying at 120°/20 mm Hg to yield colorless fluffy material of inherent viscosity 1.36.

B. The same procedure was used as in Section A. However the polymerization time was increased to 8 hr and the inherent viscosity of the product was 1.39.

C. This polymer was prepared following the procedure of Section A. After 4 hr of polymerization, excess boron trifluoride was purged from the reaction system and 0.0146 g (0.04 mmoles) of 4,4'-diphenyl ether diacid chloride was added to the solution. Polymerization was continued for 4 hr. The inherent viscosity of the product was 1.34 A,B & C are in accordance with the instant invention.

D. A 150 ml polychlorotrifluoroethylene tube was charged with 2.3265 g (10.00 mmoles) of p-phenoxybenzoyl chloride, 0.0185 g (0.05 mmoles) of 4,4'-diphenoxybenzophenone, and a stir bar. To this mixture was slowly added 10 ml of hydrogen fluoride. The tube was connected to a polychlorotrifluorethylene vacuum line which had been purged with nitrogen. Boron trifluoride gas was admitted and the reaction mixture was held at 30 psi pressure for 4 hr to give a viscous orange solution. Excess boron trifluoride was purged from the reaction system after being cooled to $-78°$ C. The polymer solution was diluted with aqueous hydrogen fluoride and then poured into rapidly stirred water. The resultant polymer precipitate was filtered and washed with water, followed by drying at 125°/20 mm Hg to yield colorless fluffy material. The inherent viscosity of the product was 1.30.

E. The same procedure was used as in Section D, however the polymerization time was increased to 8 hr. The inherent viscosity of the product was 1.31.

F. This polymer was prepared following the procedures of Section D. After 4 hr of polymerization, excess boron trifluoride was purged from the reaction system and 0.0146 g (0.04 mmoles) of 4,4'-diphenyl ether diacid chloride was added to the solution. Then polymerization was continued for 4 hr. The inherent viscosity of the resulting polymer was 4.20. This experiment was repeated to give a polymer of inherent viscosity 4.26. D, E & F are not in accordance with the instant invention and indicate the sensitivity of the prior art products to continued polymerization leading to excessively high molecular weight when contacted with additional monomer.

EXAMPLE 7

MOLECULAR WEIGHT CONTROL BY DICAPPING WITH BIPHENYL AND BENZOIC ACID

A series of polymerization experiments were run with 10 mmoles of p-phenoxybenzoyl chloride in hydrogen fluoride (25% solids concentration) at room temperature for 4 hr and 30 psi of boron trifluoride pressure. Molecular weight was controlled by the addition of biphenyl and benzoic acid in accordance with the instant invention over an inherent viscosity range of 1.0 to 1.6. These data are shown below.

| DICAPPING MOLE % | | INHERENT VISCOSITY |
|---|---|---|
| Biphenyl | Benzoic Acid | |
| 0.400 | 0.380 | 1.58 |
| 0.400 | 0.380 | 1.62 |
| 0.600 | 0.570 | 1.23 |
| 0.600 | 0.570 | 1.27 |
| 0.700 | 0.665 | 1.15 |
| 0.700 | 0.665 | 1.15 |
| 0.800 | 0.764 | 1.03 |
| 0.800 | 0.764 | 1.04 |
| 0.900 | 0.855 | 0.95 |
| 0.900 | 0.855 | 0.96 |

EXAMPLE 8

Using the apparatus and procedures of Example 6, a mixture of p-phenoxybenzoyl chloride, p-phenoxybenzophenone (0.5 mol %) and benzoic acid (0.5 mol %) were polymerized to yield a product having essentially the same properties and viscosity as material A, B & C of example 6 when polymerized for like periods of time and under similar conditions.

EXAMPLE 9

Using the apparatus and procedures of example 6 a mixture of 4,4'-diphenoxybenzophenone (4.95 mmoles), terephthaloyl chloride (5.00 mmoles) and p-phenoxybenzophenone (0.1 mmoles) was polymerized to yield a light colored fluffy polymer substantially identical to that of Example 6A and which formed a stable solution in hydrogen fluoride.

EXAMPLE 10

Using the apparatus and procedures of Example 6 a mixture of 4,4'-diphenoxybenzophenone (5.0 mmoles) terephthaloyl chloride (4.95 mmoles) and benzoic acid (0.1 mmoles) was polymerized to yield a material substantially identical to that of the last example.

EXAMPLE 11

Using the apparatus and procedures of Example 6 a mixture of p-phenoxybenzoyl chloride, benzoic acid (0.5 mole %) and, in three experiments, 0.5 mole % of p-cyanodiphenylether, p-nitrodiphenylether, and p-phenoxy diphenyl sulfone respectively to yield polymeric products of significant stability in hydrogen fluoride solution.

EXAMPLE 12

In a similar manner to that of Example 11 polymeric materials were prepared from p-phenoxybenzoyl chloride, biphenyl (0.5 mole %) and, in three experiments, 0.5 mole % of p-anisic acid, p-phenyl benzoic acid, and p-(4-chlorophenoxy) benzoic acid, said materials having stable viscosities in hydrogen fluoride.

EXAMPLE 13

In a cooled 150 ml Teflon (polytetrafluoroethylene) flask equipped with a Teflon lined stirrer was placed para-phenoxy benzoyl chloride (23.25 parts), biphenyl (0.077 parts, 0.50 mol % nucleophilic capping agent), benzoic acid (0.057 parts, 0.50 mol % electrophilic capping agent) and anhydrous hydrogen fluoride (100 parts). The mixture was stirred at 0° C. and 30 psi boron fluoride pressure applied. The mixture was allowed to warm to room temperature and stirring continued for 100 hours. The polymer solution thereby obtained was diluted to about 5% solids content with hydrogen fluoride containing 5% w/v water and poured into water in a Waring blender. The granular product was washed copiously with water and dried in vacuum (15 mm Hg) at 150° C. for four hours. The polymer, obtained in quantitative yield, had an inherent viscosity of 1.4 and an $A_s$-value of 10 at 495 nm. This polymer was melt stable and could be readily extruded.

EXAMPLE 14

This is an example using the teaching of the prior art. The procedure of example 13 was repeated except that the benzoic acid electrophilic capping agent was omitted. The recovered polymer had an inherent viscosity of 1.5 and an $A_s$-value of 400 at 495 mm. This material was essentially unextrudable due to excessive decomposition when extrusion was attempted.

EXAMPLE 15

The procedure of example 13 was followed except that after 4 hours at room temperature the boron fluoride was vented and the polymer solution stirred for another 96 hours. The resultant polymer had the same good physical properties including extrusability and appearance as that of Example 13.

EXAMPLE 16

This is an example carried out in accordance with prior art teachings. The procedure of example 15 was followed except that the benzoic acid was omitted. The recovered polymer had an inherent viscosity of 1.45 and an $A_s$-value of 350. Polymer prepared in this way was found to be unextrudable without excessive decomposition. If the polymer is recovered immediately after venting the boron fluoride (i.e., after 4 hours) a product with an inherent viscosity of 1.4 and an $A_s$ value of 35 is obtained. Polymer recovered rapidly in this way has satisfactory extrusion performance but this example shows that the reaction mixtures obtained by the prior art processes cannot be stored for any appreciable length of time without impairment of the polymer processability. This sensitivity makes the commercial production of such prior art polymers very difficult to control. In contradistinction, example 15 shows the novel polymers of the instant invention possess great stability in solution in acidic media rendering them of great commercial utility.

EXAMPLE 16

The procedure of example 13 was followed except that after adding the boron trifluoride the reaction mixture was stirred at 50° C. for four hours and then worked up as in example 13. Polymer produced in this manner has an inherent viscosity of 1.40 and an $A_s$-value of 20 and can be extruded satisfactorily.

EXAMPLE 17

This is an example carried out in accordance with prior art teachings. The procedure of example 16 was followed except for the omission of benzoic acid. Polymer produced in this manner has an inherent viscosity of 1.5 and an $A_s$-value of 415. This material suffers extensive crosslinking and discoloration during extrusion. Examples 16 and 17 show that polymerizations carried out in accordance with the instant invention are very little affected by the temperature of polymerization whereas polymerizations by prior art processes are extremely sensitive to reaction temperature. Polymer of examples 13-17 comprises recurring units of the structure.

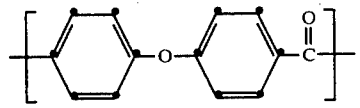

EXAMPLE 18

POLYMERIZATION OF p-PHENOXYBENZENESULFONYL CHLORIDE. MONOCAPPING VS. DICAPPING

Sodium p-phenoxybenzene sulfonate

To a dry 3-neck 5-liter flask, equipped with a mechanical stirrer and a dropping funnel, was charged 400 g (2.35 moles) of freshly distilled diphenyl ether. While stirring, 1200 ml of dry dist. methylene chloride was added slowly. A continuous stream of dry $N_2$ was passed through the reaction assembly and the flask was cooled to −23° with a dry ice/carbon tetrachloride slush bath.

From the dropping funnel was added slowly (ca. 1 hr) with stirring 152 ml (273 g, 2.35 moles) of dist. chlorosulfonic acid. The reaction mixture was stirred for 12 hr at −23° and then for 12 hr at room temperature. Then 3 liters of ice cold water was slowly added and the resulting mixture was transferred to a separatory funnel with the aid of 3 liters of water. The organic phase was separated and the aqueous phase was extracted with ether (3×800 ml). The combined organic phases were extracted with water (2×1000 ml) then dried (MgSO$_4$) and freed of solvent (40°-50°/20 mm) to yield 61.37 g (0.36 moles) of diphenyl ether. The combined aqueous extracts were briefly heated to expel organic solvents and then 1500 g of solid sodium chloride was added slowly with stirring. After cooling to room temperature, the crystalline precipitate was allowed to stand overnight. It was filtered by centrifugation and washed with 10% sodium chloride solution. The slightly wet filter cake was once more recrystallized from water. Work-up of the mother liquor gave a second crop. The filter cakes were freed of water by centrifuging at 2500 rpm for ½ hr, followed by drying at 110°/0.5 mm overnight to afford 543.4 g (2.0 moles, approximately 100%, containing some sodium chloride)

Ir (KBr) 1181 (s) and 1385 (s) cm$^{-1}$ (sulfonyl chloride), 1255 (s) cm$^{-1}$(ether); 3080 (w), 1578 (s), 1490 (s), cm$^{-1}$ (aromatic structure). Nmr (CDCl$_3$) δa 7.92 (dd, 2H, additional fine splitting), δb 7.03 (d, 2H, additional fine splitting), Jab, 9.1 Hz, 6.9-7.7 (multiplet, 5H) ppm. Anal. Calcd for C$_{12}$H$_9$ClO$_3$S: C, 53.64; H, 3.38; Cl, 13.19; S 11.93. Found: C, 53.77, 53.50, 53.59; H, 3.47, 3.40, 3.42; Cl, 13.06, 13.14, 13.26; S, 11.77, 11.86, 11.96. Tlc, after conversion with piperidine to give the sulfonamide [SiO$_2$, hexane/ether (1/1) as solvent[: one spot.

p-Phenoxybenzenesulfonyl chloride samples of two purity grades were used for this experiment. One grade melted at 41°-43° and the other at 43°-43.5°. Samples of the respective monomers (10 mmole) of containing either 0.50 mole % biphenyl (mono capped) or 0.50 mole % biphenyl and 0.48 mole % benzoic acid (dicapped) were polymerized in 10 ml of anhydrous hydrogen fluoride at room temperature and a BF$_3$ pressure of 30 psi for 16 hr. The resultant viscous solutions contained some gelatinous material when the less pure monomer was used with biphenyl as capping reagent only. The other solutions were all free of gel. Standard work-up gave colorless polymers which were evaluated for inherent viscosity before and after compression molding at 400°/5 min. The data obtained are shown below.

| Monomer Purity mp | MONOCAPPED | | | | DICAPPED | | | |
|---|---|---|---|---|---|---|---|---|
| | ηinh powder | slab | Presence of gels | Color of Slab | ηinh powder | slab | Presence of gels | Color of Slab |
| 41°-43° | 1.05 | 0.50+ | Yes | Brown | 1.00 | 1.00 | No | Colorless |
| 43°-43.5° | 1.00 | 0.98 | No | Colorless | 1.02 | 1.03 | No | Colorless | of colorless crystalline material.

p-Phenoxybenzene sulfonyl chloride

A dry 3-neck, 5-liter flask equipped with a mechanical stirrer, a dropping funnel, and a nitrogen sparge was charged with 610 g (2.42 moles) of finely ground sodium p-phenoxybenzene sulfonate suspended in 1650 ml of dry dimethyl formamide. The reaction flask was submerged in an ice bath and 195 ml (319 g, 2.68 moles) of distilled thionyl chloride was slowly added with stirring within one hr. The suspension was stirred at room temperature for 4 hr and then poured into a cold (0°) mixture of ether (1.5 l) and water (1.5 l) with vigorous stirring. The aqueous phase was separated and extracted with 300 ml of ether. The combined organic extracts were washed with cold water (300 ml), 10% NaOH solution (2×300 ml) and water (2×150 ml). The final wash water had a pH of 6.5 to 7. The ether solution was dried (MgSO$_4$) and freed of solvent [40°-50° (bath)/20 mm] to give a light yellow oil. A sample of 5 g of finely ground dry sodium chloride was added and the resulting suspension was subjected to a short path distillation at 150°-160° (bath)/3×10$^{-5}$ mm Hg using a 15 cm Vigreaux column. The column was jacketed with a heating tape kept at approximately 160°. A banana shaped receiver cooled by running water was used. A colorless distillate of 534.9 g (1.99 moles, 82%) was obtained. The distillate crystallized on standing; mp 41°-43°. Two recrystallizations from ether/pentane under rigorously anhydrous conditions gave 480 g (1.78 moles, 74%) of colorless crystals: mp 43.0°-43.5° zone refining and/or vacuum sublimation did not raise the mp.

EXAMPLE 19

A sample of 2.32 parts of p-phenoxybenzoyl chloride containing 0.5 mole % diphenyl ether and 1.0 mole % benzoic acid in accordance with the teachings of the present invention was polymerized in 10 parts of anhydrous hydrogen fluoride for 4 hr at room temperature under a boron trifluoride pressure of 30 psi. The polymer solution was worked up as in example 9 to give a colorless material which had an inherent viscosity of 1.46 and an A$_s$-value of 15. This experiment was repeated, but the reaction time was extended to 90 hr. The resultant polymer had an inherent viscosity of 1.51 and an A$_s$-value of 25. In another set of experiments the above preparation of polymer was repeated except that in one experiment only 0.5 mole % of benzoic acid was used and in the other no benzoic acid was used. In both experiments after four hrs of reaction the polymer had an inherent viscosity of about 1.45 and a low A$_s$ but after 90 hrs of reaction the inherent viscosities were much higher, the recovered polymers contained gel particles were highly colored and had very high As values. These experiments illustrate the distinct function performed by a molecular weight control reagent (diphenyl ether) and a capping reagent (benzoic acid).

I claim:
1. A polymer which comprises repeating units of the general formula:
—M—Ar—D—Ar'— wherein each of M and D, which may be the same or different, is

or —SO₂—, Ar is a group of the formula

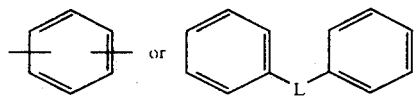

wherein L is

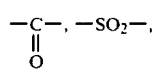

phenyleneoxy,

a covalent bond, —O—, —S—, a group of the formula —CR₂— wherein each of the R groups, which may be the same or different, is —H, alkyl, fluoroalkyl, phenyl or phenyl substituted by an electron-withdrawing group, or a group of the formula —O—Ar—O— wherein Ar is as defined above; and Ar' is a group of the formula

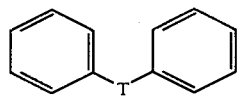

wherein T is —O—, —S—, phenyleneoxy, a group of the formula —CR₂— as defined above or a group of the formula —O—Ar—O— as defined above; the polymer molecules being capped at each end by a capping group, each of the capping groups, which may be the same or different, being a group of the formula

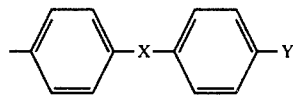

wherein X is a covalent bond —O—, —S—, or a group of the formula —CR₂— as defined above, and Y is —CN, —NO₂,

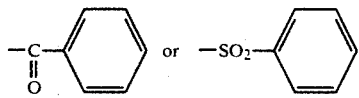

or, if X is a covalent bond, hydrogen; a group of the formula

wherein Ar" is a phenyl, naphthyl, biphenyl or terphenyl group which is unsubstituted or substituted by at least one electron-withdrawing group which is substituted on the phenoxyphenyl group which is substituted on the phenoxy moiety by at least one electron-withdrawing group; or a group of the formula —SO₂—AR" wherein Ar" is as defined above.

2. The polymer of claim 1 wherein D and M are

3. The polymer of claim 1 wherein D and M are —SO₂—.

4. The polymer of claim 1 wherein Ar is phenylene.

5. The polymer of claim 1 wherein Ar is

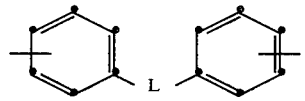

6. The polymer of claim 5 wherein L is

7. The polymer of claim 5 wherein L is —O—.

8. The polymer of claim 1 wherein the T of Ar' is —O— or phenyleneoxy.

9. The polymer of claim 1 wherein T is —O—.

10. The polymer of claim 1 wherein the capping groups are independently

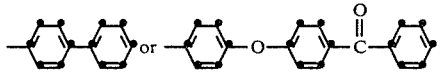

11. The polymer of claim 1 wherein Y of both capping groups is

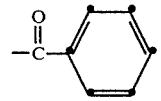

12. The polymer of claim 1 wherein one of the capping groups is

and Y of the other is

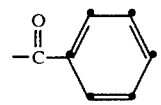

13. In a process for the preparation of a polymer in accordance with claim 1 by the Friedel-Crafts catalyzed condensation polymerization of:

(Type A) a first monomer of mixture of monomers comprising a diacid halide and a second monomer or mixture of monomers containing at least two aromatically bound hydrogen atoms displaceable in said condensation polymerization, or (Type B) a monomer or mixture of monomers each of said monomer or monomers having at least one aromatically bound hydrogen atom displaceable in said condensation polymerization and at least one acid halide group, the improvement comprising adding to the polymerization reaction in a Type A polymerization from about 0.002 to about 0.10 moles of a nucleophilic capping agent, as hereinafter defined, per mole of first monomer when said first monomer is present in molar excess; from about 0.002 to about 0.10 moles of an electrophilic capping agent, as hereinafter defined, per mole of second monomer when said second monomer is in molar excess; and from about 0.001 to about 0.05 moles of each of an electrophilic and a nucleophilic capping agent per mole of said first monomer when said first and second monomers are present in substantially equimolar amounts; and from about 0.001 to about 0.05 moles of each of an electrophilic and a nucleophilic capping agent per mole of monomer in a Type B polymerization, wherein said nucleophilic capping agent has the general formula

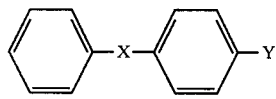

wherein X is a covalent bond, —O—, —S—, or —CR₂— wherein each R is independently hydrogen, or an alkyl or fluoroalkyl group of 1 to 10 carbons, phenyl or an electron withdrawing group substituting phenyl and Y is

or when X is a covalent bond Y is hydrogen, and wherein said electrophilic capping agent has the general formula Ar″COZ or Ar″SO₂Z wherein Z is OH, halogen or OR wherein R is an alkyl group and wherein Ar″ is phenyl, phenoxyphenyl, naphthyl, biphenyl or terphenyl either unsubstituted or substituted with at least one electron withdrawing substituent.

14. The process of claim 13 wherein said polymerization is catalysed by a mixture of hydrogen fluoride and boron trifluoride.

15. The process of claim 13 wherein said nucleophilic capping agent is biphenyl, 4-phenoxybenzophenone or an equimolar mixture of diphenyl ether and benzoic acid.

16. The process of claim 13 wherein said electrophilic capping agent is benzoic acid or benzene sulfonic acid.

17. The process of claim 13 wherein said capping agent is added at the beginning of said polymerization.

18. The process of claim 13 wherein said polymerization is a Type B polymerization and wherein said electrophilic and said nucleophilic capping agents are added in substantially equimolar amounts.

19. The process of claim 18 wherein said capping agents are each present in an amount equal to 0.002 to 0.01 moles per mole of monomer.

20. The polymer of claim 1 comprising recurring units of the structure

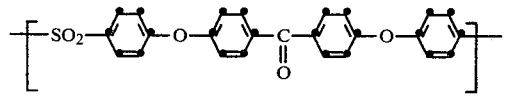

21. The polymer of claim 1 comprising recurring units of the structure

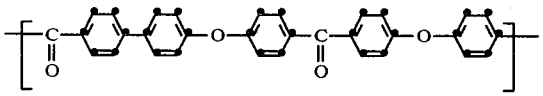

22. The polymer of claim 1 comprising recurring units of the structure

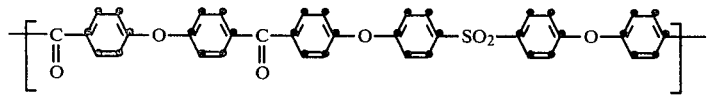

23. The polymer of claim 1 comprising recurring units of the structure

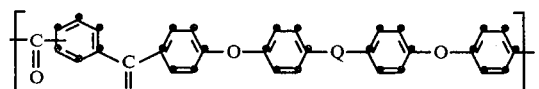

wherein Q is

or —SO₂—.

24. The polymer of claim 1 wherein said polymr has an inherent viscosity ranging from about 0.5 to about 2.0 for a solution having a concentration of 0.1 g polymer per 100 ml. of concentrated sulfuric acid at 25° C.

25. The polymer of claim 1 comprising recurring units of the structure

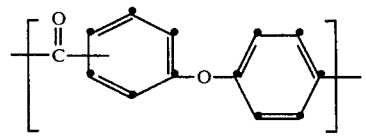

26. The polymer of claim 1 comprising recurring units of the structure

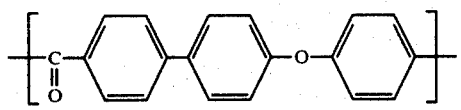

27. The polymer of claim 1 comprising recurring units of the structure

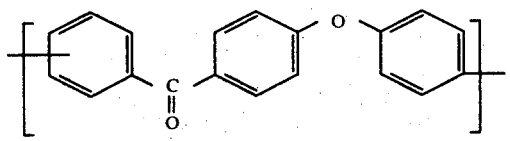

28. The polymer of claim 1 comprising recurring units of the structure

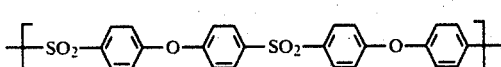

29. The polymer of claim 1 comprising the recurring unit

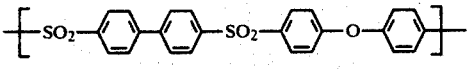

30. The polymer of claim 1 comprising recurring units of the structure

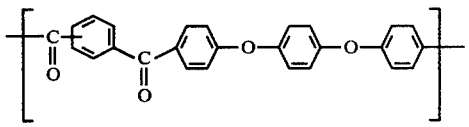

31. The polymer of claim 1 comprising recurring units of the structure

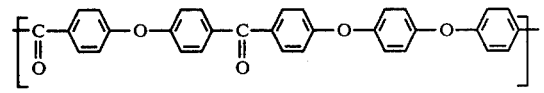

32. The polymer of claim 1 comprising recurring units of the structure

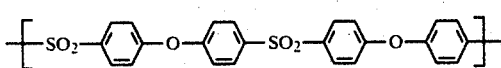

33. The polymer of claim 1 comprising recurring units of the structure

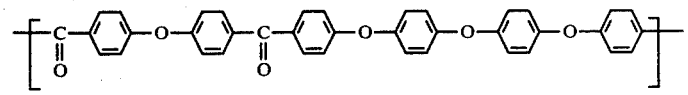

34. The polymer of claim 1 wherein R is an alkyl or fluoroalkyl group of 1 to 10 carbon atoms.

35. The polymer of claim 1 wherein the number of repeating units is from about 5 to about 300.

36. A polymer according to claim 1 wherein the electron withdrawing groups are selected from members of the group consisting of halogen, nitro and cyano.

37. A process according to claim 13 wherein the electron withdrawing groups are selected from members of the group consisting of halogen, nitro and cyano.

* * * * *